Z. C. ANGEVINE.
COLLAPSIBLE BED.
APPLICATION FILED SEPT. 22, 1913.

1,101,481.

Patented June 23, 1914.

3 SHEETS—SHEET 1.

Witnesses.

Inventor,
by Zenus C. Angevine,

Attorneys.

Z. C. ANGEVINE.
COLLAPSIBLE BED.
APPLICATION FILED SEPT. 22, 1913.
1,101,481.
Patented June 23, 1914.
3 SHEETS—SHEET 2.
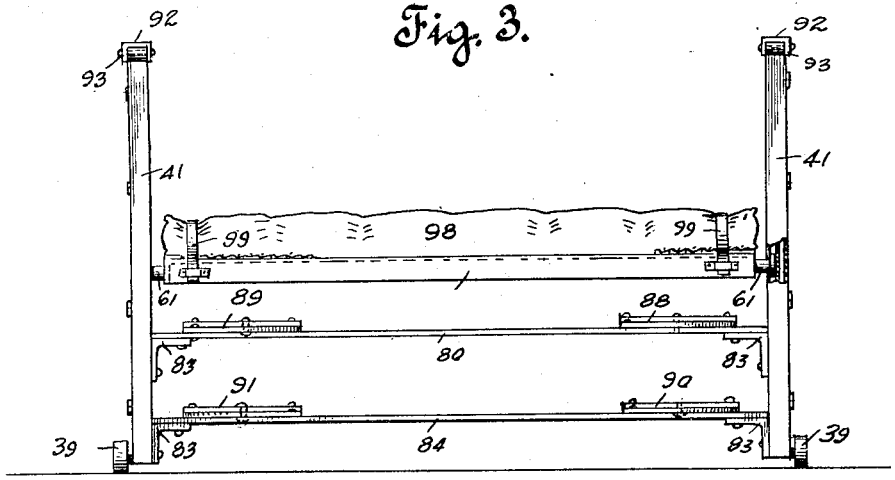
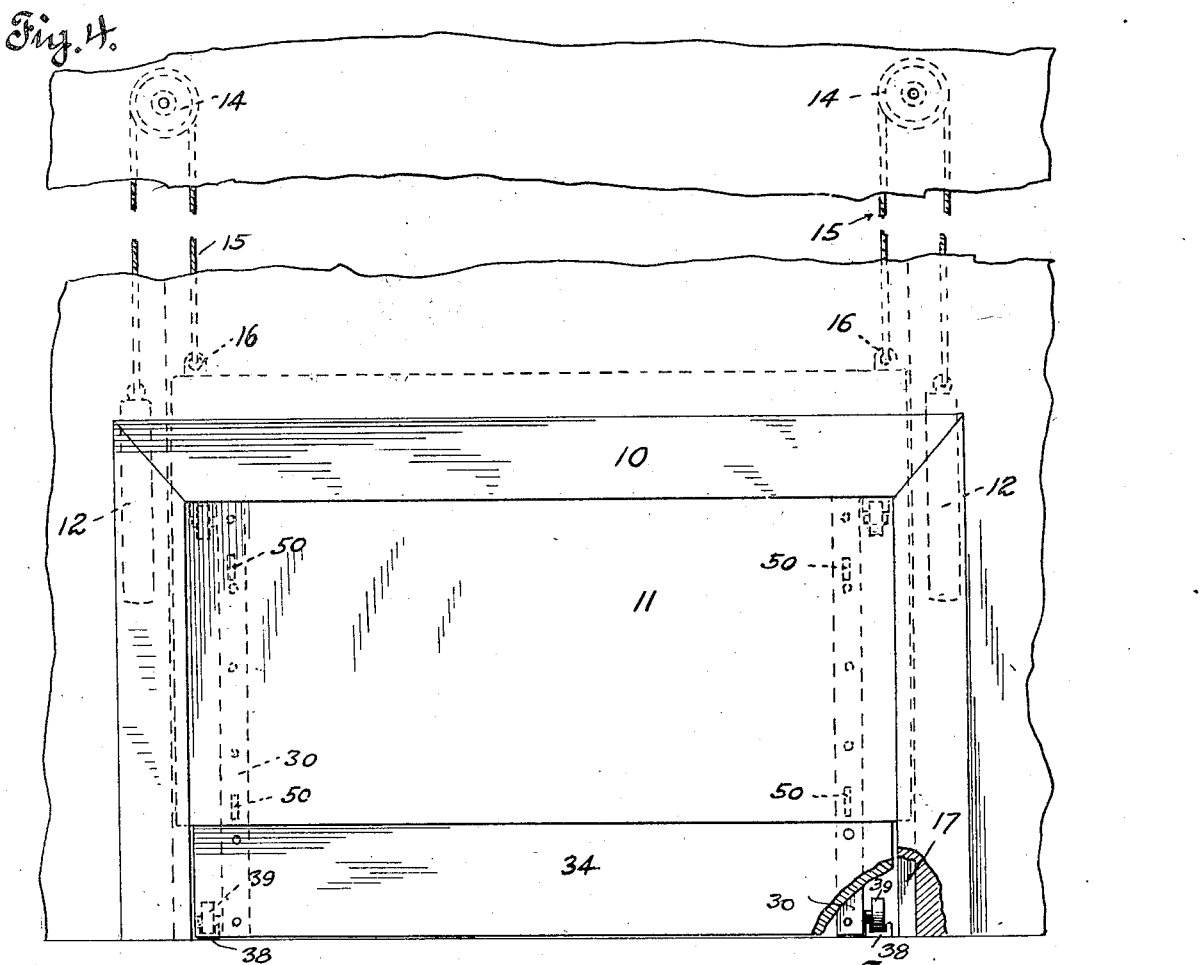

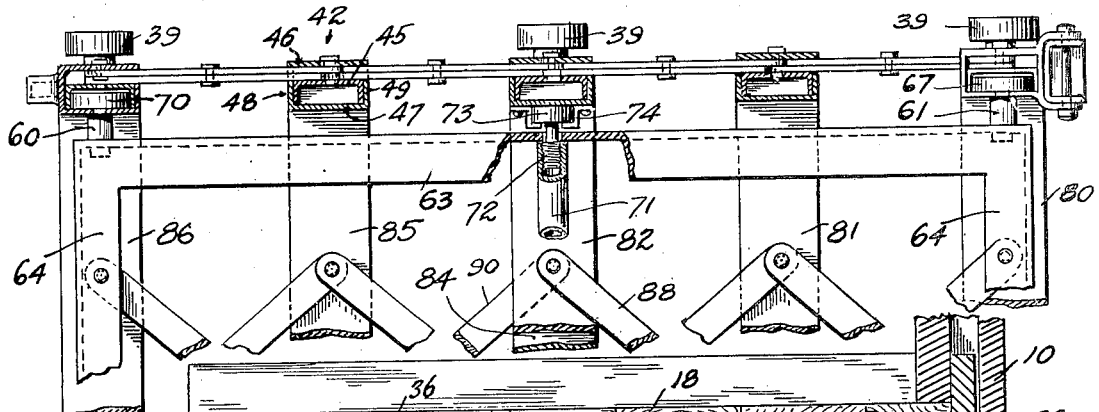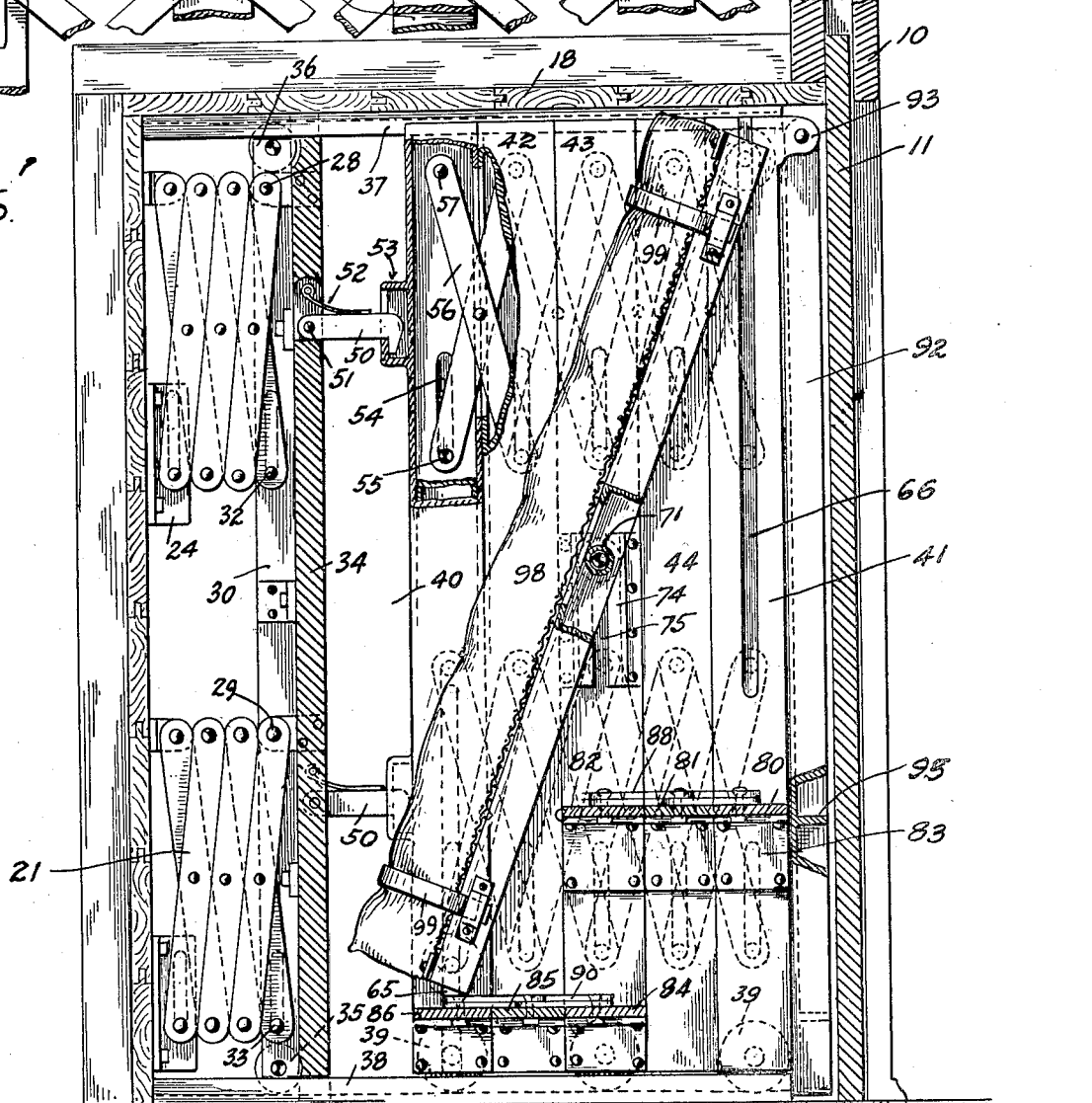

UNITED STATES PATENT OFFICE.

ZENUS C. ANGEVINE, OF LONGBEACH, CALIFORNIA.

COLLAPSIBLE BED.

1,101,481.

Specification of Letters Patent. Patented June 23, 1914.

Application filed September 22, 1913. Serial No. 791,048.

*To all whom it may concern:*

Be it known that I, ZENUS C. ANGEVINE, a citizen of Canada, residing at Longbeach, in the county of Los Angeles, State of California, have invented new and useful Improvements in Collapsible Beds, of which the following is a specification.

This invention relates to collapsible beds, and the principal object is to provide a bed that will collapse into a limited space and be concealed in a recess in a wall.

It is also an object to provide a collapsible bed in which the bed spring and bedding thereon will be tipped so that these latter will be included within the collapsed compass of the bed.

It is also an object to provide a receptacle with a panel mounted in conjunction with a plurality of lazy tongs so that the same closes the recess when the bed is removed therefrom.

It is also an object to provide the head and foot of a bed with lazy tongs so that the plurality of posts composing the head and foot will be carried in parallel relation.

It is also an object to provide means to lock the foot and head of the bed to the movable panel in the receptacle.

It is also an object to provide a sliding door adapted to entirely close the recess when the bed is secured therein.

It is also an object to provide casters to support the bed, which roll in a track within the receptacle.

It is also an object to provide a collapsible bed with ball bearing sliding connections upon which the bed spring frame is tiltingly mounted.

It is a still further object to provide means to lock the bed in open position so that it may be readily moved from place to place as desired within the room.

Figure 1:
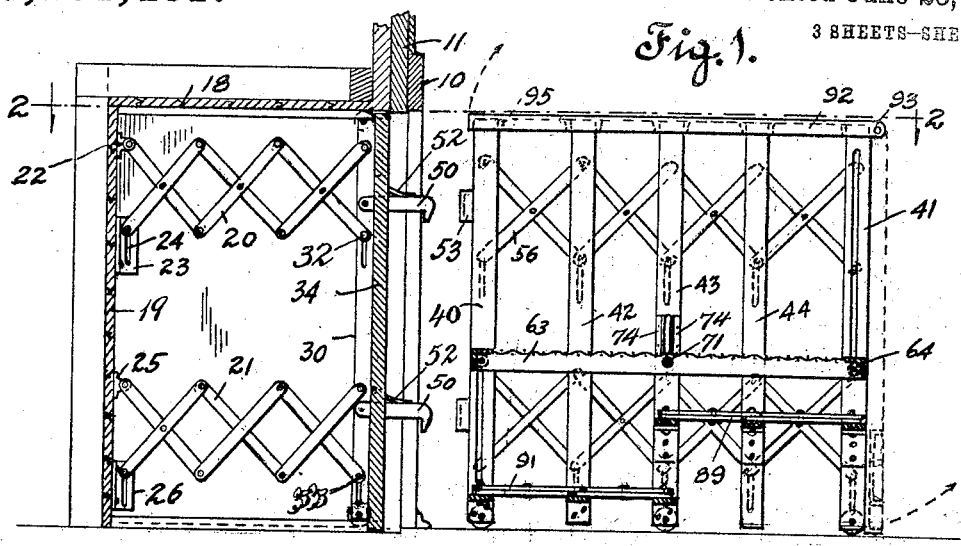
Figure 2:
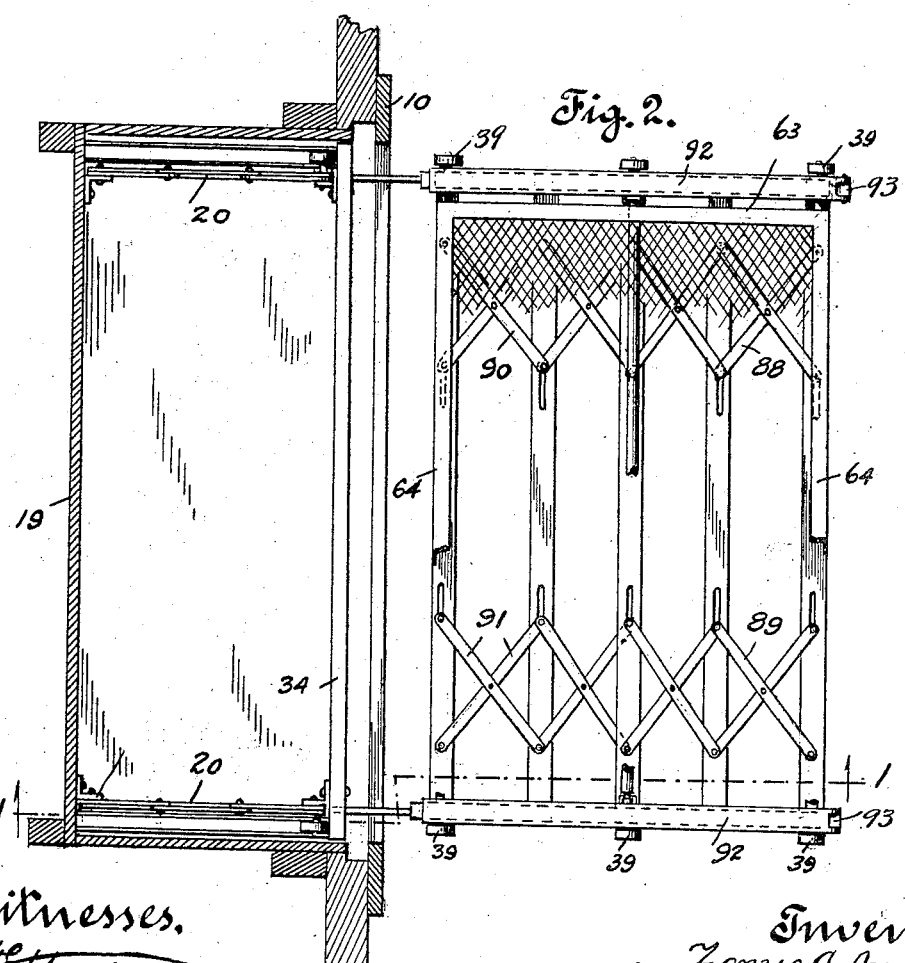

In the drawings accompanying this specification and forming therewith the application for Letters Patent: Figure 1 is a transverse section on the line 1—1 of Fig. 2. Fig. 2 is a horizontal section on the line 2—2 of Fig. 1 showing the bed partly inclined and with the bed spring frame broken away to clearly show the details. Fig. 3 is a side view of the bed, a portion of one of the corner posts being broken away to show the ball bearing roller therein. Fig. 4 is a front view of the wall showing the sliding door partly closed and a small portion of the recess panel broken away to clearly show the track for the bed and the guide way for the sliding door. Fig. 5 is an enlarged detail transverse section of one end of the bed broken away in parts to show the preferred construction of the posts forming the uprights of the ends of the bed. Fig. 6 is an enlarged detail transverse vertical section through the recess showing the bed collapsed therein and the recess panel and the bed frame in the tilted or collapsed condition.

More specifically in the drawings, 10 designates a casing surrounding a recess cut in the side wall of a room of such width as to accommodate the length of the bed and of such depth, as clearly shown in Fig. 6, as to house the bed therein so that the sliding door 11 mounted within the wall may be lowered from its elevated position, the weight of this panel 11 being balanced by the weights 12 which are carried over the pulleys 14 by means of the line 15 secured to the panel by means of the eyes 16. A suitable groove 17 is provided in the side of the casing for the door to slide in and the recess is preferably inclosed by the woodwork 18 forming the ceiling and the rear wall 19.

Secured to the rear wall are a plurality of lazy tongs 20 and 21, the upper end of the upper set 20 being secured to a bracket 22, the lower end being slidably mounted in a bracket 23 provided with a suitable vertically disposed slot on its web 24. Similar brackets 25 and 26 provide means for securing the lower set of tongs 21, the opposite ends of these tongs being secured by means of their pivotal points 28 and 29 to a web 30 which is provided with slots vertically disposed thereon in which the pins 32 and 33 of the lazy tongs are slidably mounted. The web 30 is secured to a panel 34 which exactly fits within the recess and is preferably provided with a certain amount of ornamentation on its front face so that when the bed is removed and this panel is extended by means of sliding upon the rollers 35 and 36 mounted on the respective ends thereof it will have a finished appearance. The rollers referred to are provided with tracks 37 and 38 respectively which also are used by rollers 39 upon which the bed frame itself is mounted or more specifically the end and middle posts of each end or head and foot of the bed. These end posts are respectively designated 40 and 41, the head and foot posts both being of the same height and width and, as are the other three posts 42, 43 and 44 forming the ends, are preferably of a tubular form or built up inclosing a channeled iron 45, the posts having a front wall 46 and a rear wall 47 secured thereto, together with side walls 48 and 49.

Secured to the panel 34 are a plurality of latching members 50 pivoted on pivot pins provided with a leaf spring 52, these members being adapted to latch within the slotted strikes 53 secured to the posts 40. The front wall 46 of these posts 40 are slotted as shown at 54 within which the pin 55 of the lazy tong member 56 slides, the upper end being pivoted at the point 57 to each of the posts respectively, each post being provided with a slot corresponding and in parallel line with the slot 54. The inner or near walls of the end posts 40 and 41 are also slotted to provide for the movement of the trunnions 60 and 61 which are secured to the respective corners of the bed spring frame, or rather the end face 63 of the bed frame which is connected by the side bars 64 to the oppositely disposed end face. These trunnions project within the slots, that within the post 40 being designated 65 and extending from a point where the trunnion 60 is fixed when the bed is in open position to a point adjacent the bottom of the post and in parallel relation to the sides thereof, the oppositely disposed corner post 41 being provided with a slot 66 which extends from the locking position of the trunnion 61 to the upper end of the post so that the trunnion with its wheel 67 supported thereon may be inserted into the recess formed by the channeled iron 45 and the inner wall 47. The trunnion 60 supports a wheel 70 which is preferably provided with a ball bearing so that it may roll readily in the channel.

To support the center of the bed spring frame a tube 71 is preferably provided which extends from end to end of the bed spring frame and is supported in the vertical web of the end bars 63, each end of the tube being threaded and adapted to receive the threaded portion of the trunnion 72 which carries on its outer end a roller 73 adapted to be engaged by the guide ways 74 which are secured to the posts 43 on either side of each trunnion so that a vertically slotted guide way 75 is provided within which each wheel and trunnion slides.

To properly space the head and foot posts of the bed longitudinally disposed bars 80, 81 and 82 connect the end posts 41, 44 and 43 at a point preferably below the open position of the bed spring frame and are braced to the posts by means of corner brackets 83. Owing to the tilting position of the bed spring frame when the latter is collapsed the bars 84, 85 and 86 connecting the oppositely disposed posts 40, 42 and 43 must be placed in the plane shown or below the lower edge of the bed frame in the tilted position, these bars being secured to their posts by corner brackets 87. To insure the proper movement of these bars in the collapsing movement four sets of lazy tongs 88, 89, 90 and 91 are provided, the first pair being connected to the upper set of bars 80 to 82, and the second pair to the lower bars 84 to 86. To lock the bed frame in the open position bars 92 are provided preferably built of channeled iron and each pivoted at one end in the brackets 93 secured to the upper outer corner of the posts 41 so that this bar will fold over as clearly shown in Figs. 1 and 2 to cover the upper ends of the respective posts forming the head and foot of the bed, and these channeled bars are preferably provided with webs or lugs 95 which are so spaced that they engage on either side of the heads of the posts and properly space these bars in their open relation.

The operation of the bed will be readily understood from the description and the drawings. Assuming that the bed is in the open position as shown in Fig. 1, the operation of closing the structure will be described. First the bar 92 on each end is swung over, as indicated by the dotted lines, to the dotted position along side the post 41, the bed is then pushed to the left until the latches 51 engage in the strikes 52 on the oppositely disposed post 40. When this occurs the caster wheels 39 will be in line with the channeled rails 38 and pressure upon the bars 41 as well as lifting upon the side bar 64 on the outer side of the bed will tilt the bed spring frame by lowering the oppositely disposed side, the center wheel rising slightly in the slot 75 and each one of the posts will be forced into engagement with its adjacent post, the bed in the meantime traveling within the recess and forcing the panel 34 to the rear until the parts each assume the position shown in Fig. 6, the mattress 98 being secured to the frame by means of the spring clips 99 together with bedding applied thereto, the interval between the post 40 and panel 34 being provided to accommodate the mattress and bedding. The sliding door 11 is then drawn down and the entire structure will be concealed from view giving no intimation that the space is occupied by a bed.

What I claim is:

1. In a collapsible bed construction a plurality of posts forming a head and foot therefor, means to secure pairs of said posts in fixed relation, means to pivot a bed spring frame thereon, and means to connect the fixed posts in collapsible relation.

2. A collapsible bed stead construction, comprising a plurality of vertically disposed posts, means to secure pairs of said posts in fixed relation to form a head and foot for said bed, a bed spring frame tiltingly mounted in relation to said posts, and means to connect said posts by means of lazy tongs, whereby said posts will be maintained in parallel and collapsible relation to each other.

3. A collapsible bed construction, comprising a plurality of vertically disposed posts adapted to form head and foot portions of a bed, means to hold oppositely disposed pairs of said posts in fixed relation, a bed spring frame connected to certain of said posts and adapted to slide thereon, lazy tongs secured in operable relation to said posts and said fixed connections, and means to lock said bed in open relation with said bed spring frame in operable position.

4. In a collapsible bed frame construction in combination with an inclosure, of means to wall off said inclosure, tracks mounted within said inclosure, a panel horizontally movable in said inclosure, latching means mounted thereon, means to preserve said movable panel in parallel relation, a bed frame formed of a plurality of parallel disposed posts forming head and foot portions therefor, strikes on certain of said bed posts adapted to engage with said latches, a spring frame mounted upon said posts and adapted to tilt thereon, and means connecting said posts, whereby they may be collapsed or extended within said inclosure.

5. In a collapsible bed construction a plurality of posts, means to connect pairs of said posts in fixed relation, means to connect adjacent pairs in collapsible condition, means to pivot a bed spring thereon, and means to tilt said bed spring frame coincidently with the collapsing of said posts.

6. In a collapsible bed frame construction in combination with a recess adjacent thereto, of a movable panel slidably mounted within said recess, latching means secured thereon, means to preserve said panel in parallel relation, a bed frame having strikes thereon adapted to engage said latching means, said bed stead being formed of a plurality of movable sections adapted to collapse in relation to each other and engage said panel to move the same within said recess, and a door to said recess adapted to wall off said bed and said panel.

In witness that I claim the foregoing I have hereunto subscribed my name this 10th day of September, 1913.

ZENUS C. ANGEVINE.

Witnesses:
    EDMUND A. STRAUSE,
    MARIE BATTEY.